(12) United States Patent
Park et al.

(10) Patent No.: US 9,285,989 B2
(45) Date of Patent: Mar. 15, 2016

(54) MOBILE TERMINAL AND METHOD OF CONTROLLING THE SAME

(75) Inventors: Sungkyun Park, Seoul (KR); Hangyu Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 167 days.

(21) Appl. No.: 13/192,355

(22) Filed: Jul. 27, 2011

(65) Prior Publication Data

US 2012/0075212 A1  Mar. 29, 2012

(30) Foreign Application Priority Data

Sep. 27, 2010  (KR) .......................... 10-2010-0093415

(51) Int. Cl.
*G06F 3/041* (2006.01)
*G06F 3/0488* (2013.01)

(52) U.S. Cl.
CPC .......... *G06F 3/04886* (2013.01); *G06F 3/0488* (2013.01)

(58) Field of Classification Search
None
See application file for complete search history.

(56) References Cited

U.S. PATENT DOCUMENTS

| 5,767,835 | A * | 6/1998 | Obbink et al. ................ 715/861 |
| 8,166,411 | B2 * | 4/2012 | Zhang ............................ 715/769 |
| 2006/0007123 | A1 | 1/2006 | Wilson et al. |
| 2008/0158189 | A1 * | 7/2008 | Kim .............................. 345/173 |
| 2008/0270900 | A1 * | 10/2008 | Wezowski ..................... 715/702 |
| 2009/0174679 | A1 * | 7/2009 | Westerman .................... 345/173 |
| 2010/0020035 | A1 | 1/2010 | Ryu et al. |
| 2010/0127995 | A1 | 5/2010 | Rigazio et al. |
| 2011/0055753 | A1 * | 3/2011 | Horodezky et al. ........... 715/810 |

FOREIGN PATENT DOCUMENTS

| CN | 101021762 | 8/2007 |
| CN | 101183292 | 5/2008 |
| CN | 101482785 | 7/2009 |
| EP | 2077490 | 7/2009 |
| EP | 2148497 | 1/2010 |
| WO | 2007/103631 | 9/2007 |

OTHER PUBLICATIONS

State Intellectual Property Office of the People's Republic of China Application Serial No. 201110285236.0, Office Action dated Aug. 23, 2013, 9 pages.
The State Intellectual Property Office of the People's Republic of China Application Serial No. 201110285236.0, Office Action dated May 8, 2014, 13 pages.

* cited by examiner

*Primary Examiner* — Nicholas Lee
*Assistant Examiner* — Duane N Taylor, Jr.
(74) *Attorney, Agent, or Firm* — Lee, Hong, Degerman, Kang & Waimey

(57) ABSTRACT

A mobile terminal and a method of controlling the same are provided. The method includes receiving a touch input from a side area on a touch screen for more than a predefined amount of time; setting a touch-lock area on the touch screen based on an area of the detection of the touch input; and displaying the touch-lock area differently from the rest of the touch screen so as to be easily distinguishable. Therefore, it is possible to effectively set a touch-lock area on the touch screen and thus to prevent the mobile terminal from performing an operation against the will of a user.

19 Claims, 12 Drawing Sheets

(a)

(b)

(c)

(d)

(a)　　　　　(b)

(c)

(a)  (b)

MOBILE TERMINAL AND METHOD OF CONTROLLING THE SAME

CROSS-REFERENCE TO RELATED APPLICATION

Pursuant to 35 U.S.C. 119(a), this application claims the benefit of earlier filing date and right of priority to Korean Application No. 10-2010-0093415, filed on Sep. 27, 2010, the contents of which is incorporated by reference herein in its entirety.

BACKGROUND OF THE INVENTION

1. Field of the Invention

The present invention relates to a mobile terminal and a method of controlling the same, and more particularly, to a mobile terminal and a method of controlling the same, in which one or more touch-lock areas can be effectively set on a touch screen of the mobile terminal.

2. Description of the Related Art

Mobile terminals are portable devices capable of performing voice/video calls, inputting and outputting information, and/or storing data. As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

In the meantime, users may accidentally touch the touch screens of mobile terminals while using the mobile terminals. Thus, a method is needed to prevent mobile terminals from malfunctioning in response to an accidental touch on their touch screens.

SUMMARY OF THE INVENTION

The present invention provides a mobile terminal and a method of controlling the same, in which one or more touch-lock areas that do not respond to any typical touch input can be effectively set and modified on a touch screen of the mobile terminal.

According to an aspect of the present invention, there is provided a method of controlling a mobile terminal, the method including receiving a touch input from a side area on a touch screen for more than a predefined amount of time; setting a touch-lock area on the touch screen based on an area of the detection of the touch input; and displaying the touch-lock area differently from the rest of the touch screen so as to be easily distinguishable.

According to another aspect of the present invention, there is provided a method of controlling a mobile terminal, the method including setting a touch-lock area on a touch screen differently according to an operating mode of the mobile terminal; and displaying the touch-lock area differently from the rest of the touch screen so as to be easily distinguishable.

According to another aspect of the present invention, there is provided a mobile terminal including a touch screen; and a controller configured to receive a touch input from a side area on the touch screen for more than a predefined amount of time, set a touch-lock area on the touch screen based on an area of the detection of the touch input and display the touch-lock area differently from the rest of the touch screen so as to be easily distinguishable.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
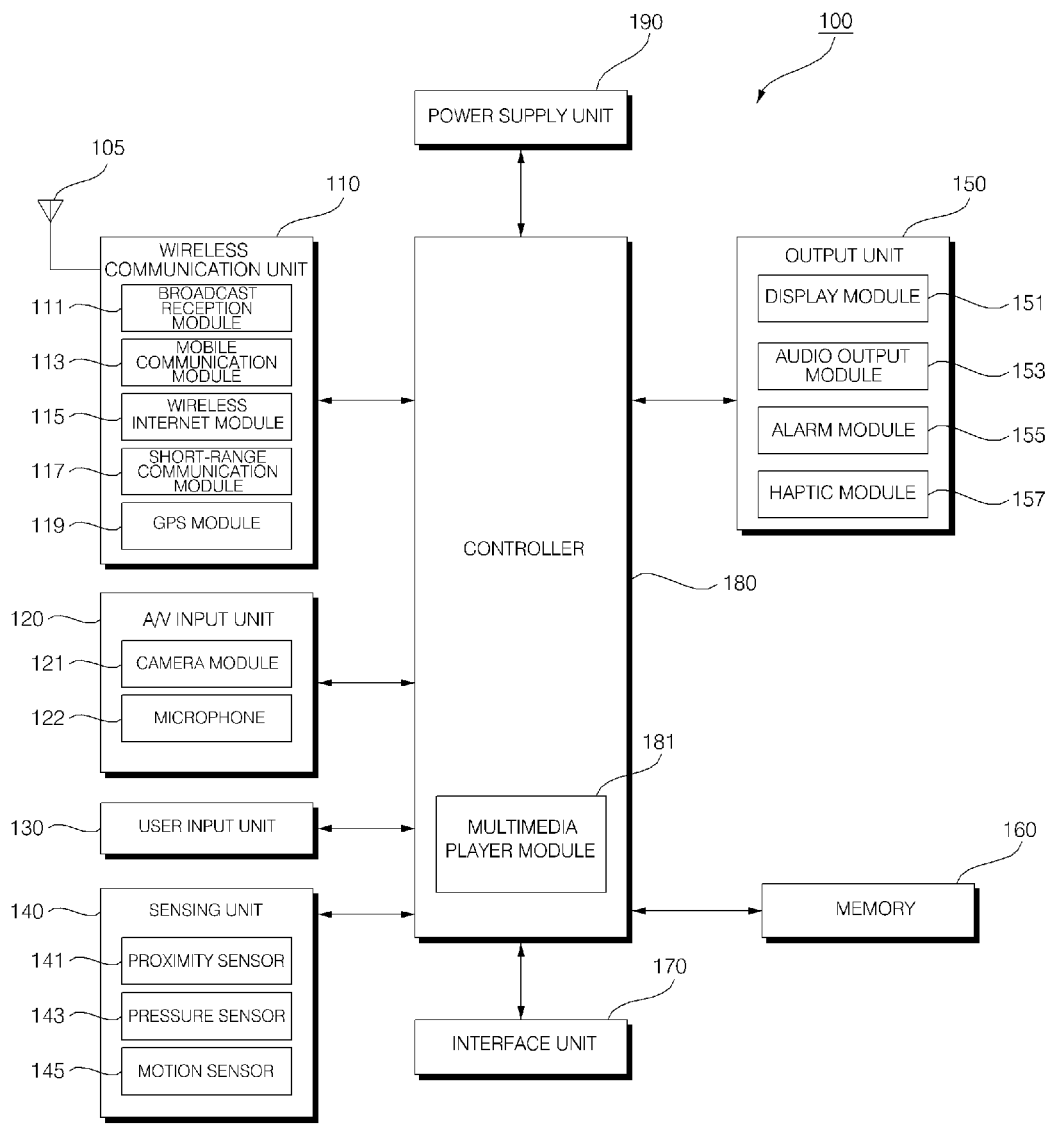
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless Internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, a combination of a data broadcast signal and a TV broadcast signal or a combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111.

The broadcast reception module 111 may receive broadcast signals using various broadcasting systems. In particular, the broadcast reception module 111 may receive digital broadcast signals using various digital broadcasting systems. In addition, the broadcast reception module 111 may be suitable not only for digital broadcasting systems but also for nearly all types of broadcasting systems other than digital broadcasting systems. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device. The wireless Internet module 115 may be embedded in the mobile terminal 100 or may be installed in an external device. The wireless Internet module 115 may use various wireless Internet technologies such as wireless local area network (WLAN), Wireless Broadband (WiBro™), World Interoperability for Microwave Access (Wimax™), and High Speed Downlink Packet Access (HSDPA).

The short-range communication module 117 may be a module for short-range communication. The short-range communication module 117 may use various short-range communication techniques such as Bluetooth™, radio frequency identification (RFID), infrared data association (IrDA), ultra wideband (UWB), and ZigBee™.

The GPS module 119 may receive location information from a plurality of GPS satellites.

The A/V input unit 120 may be used to receive audio signals or video signals. The A/V input unit 120 may include a camera module 121 and a microphone 122. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the location of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more proximity sensor 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
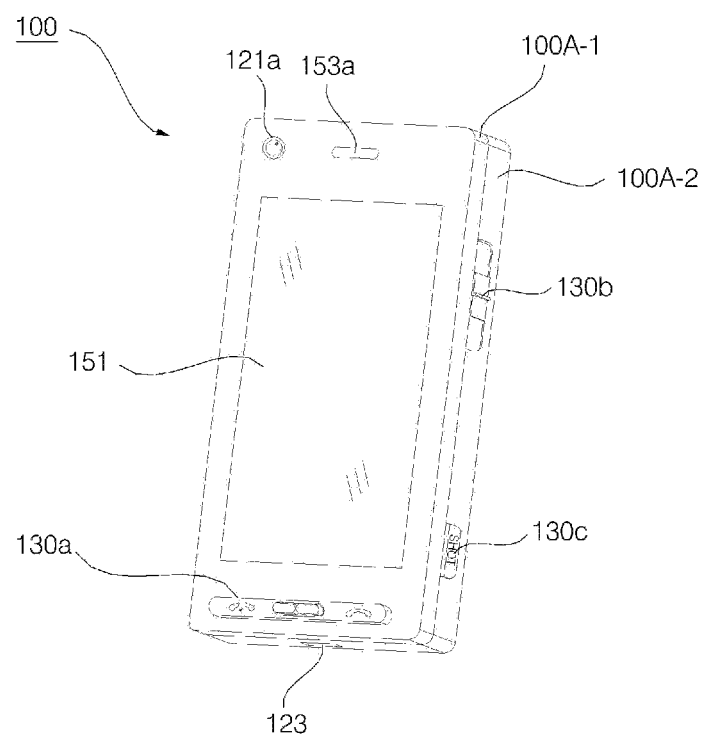
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100A-1 and a rear case 100A-2. Various electronic devices may be installed in the space formed by the front case 100A-1 and the rear case 100A-2. At least one middle case (not shown) may be additionally provided between the front case 100A-1 and the rear case 100A-2. The front case 100A-1, the rear case 100A-2 and the middle case(s) may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a, and a first user input module 130a may be disposed in the main body of the mobile terminal 100, and particularly, in the front case 100A-1. Second and third user input modules 130b and 130c and the microphone 123 may be disposed on one side of the rear case 100A-2.

The display module 151 may include an LCD or OLED that can visualize information. If a touch pad is configured to overlap the display module 151 and thus to form a mutual layer structure, the display module 151 may serve as a touch screen. Thus, the user can enter various information simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through third user input modules 130a through 130c and fourth and fifth user input modules 130d and 130e may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first user input module 130a may be used to enter various commands such as 'start', 'end', and 'scroll' to the mobile terminal 100, the second user input module 130b may be used to select an operating mode for the mobile terminal 100, and the third user input module 130c may serve as a hot key for activating certain functions of the mobile terminal 100.

When the display module 151 is approached by the user's finger, the proximity sensor 141 may detect the existence of the approaching finger, and may output a proximity signal. The proximity sensor 141 may output different proximity signals according to the distance between the display module 151 and the approaching finger. For a precise detection of the approaching finger, a plurality of proximity sensors 141 having different detection ranges may be employed. In this case, it is possible to precisely determine the distance between the approaching finger and the display module 151 by comparing a plurality of proximity signals respectively provided by the plurality of proximity sensors 141. In addition, it is possible to determine which part of the display module 151 is being approached by the approaching finger and whether the approaching finger is moving within the close vicinity of the display module 151 by determining which of the plurality of proximity sensors 141 are outputting proximity signals. The controller 180 may identify a touch key, if any, currently being approached by the approaching finger and may then control the haptic module 157 to generate a vibration signal corresponding to the identified touch key.

When the user tilts or shakes the mobile terminal 100, the motion sensor 145 may detect the movement of the mobile terminal 100, and may generate a signal corresponding to the detected movement to the controller 180. The controller 180 may extract various motion information such as the direction, angle, speed and intensity of the movement of the mobile terminal 100 and the location of the mobile terminal 100 from the signal provided by the motion sensor 145.

The controller 180 may keep track of the movement of the mobile terminal 100 based on the extracted motion information. The type of motion information that can be extracted from the signal provided by the motion sensor 145 may vary according to the type of motion sensor 145. Thus, more than one motion sensor 145 capable of providing desired motion information may be employed in the mobile terminal 100. The controller 180 may control the motion sensor 145 to operate only when a predetermined application is executed.

Figure 3:
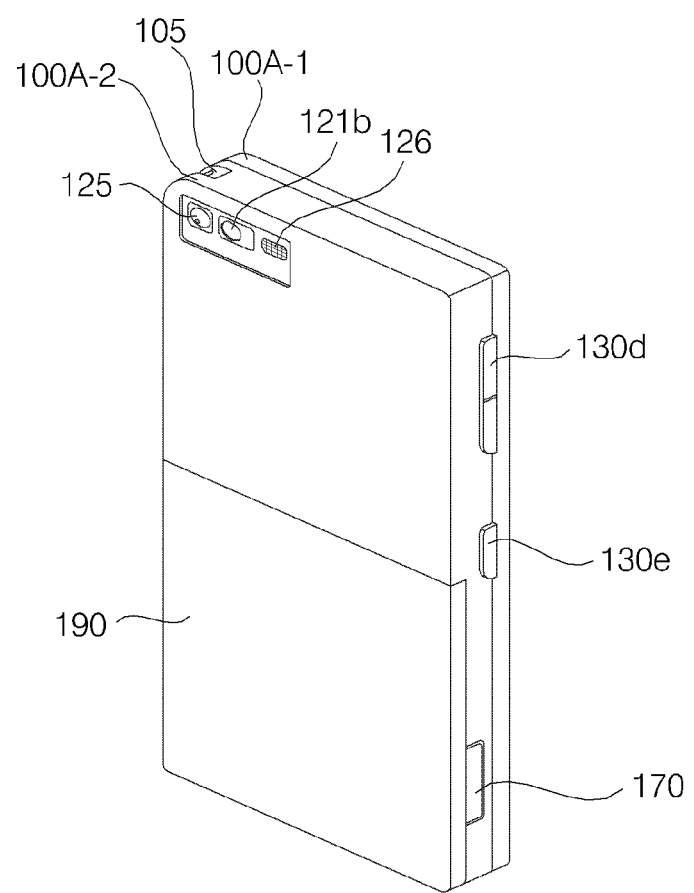
FIG. 3 illustrates a rear perspective view of the mobile terminal shown in FIG. 2.

FIG. 3 illustrates a rear perspective view of the mobile terminal 100. Referring to FIG. 3, the fourth and fifth user input modules 130d and 130e and the interface unit 170 may be disposed on one side of the rear case 100A-2, and a second camera 121b may be disposed at the back of the rear case 100A-2.

The second camera 121b may have a different shooting direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare him- or herself for taking a self-portrait. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used in a speaker-phone mode.

Not only an antenna (not shown) for making or receiving a call but also an antenna (not shown) for receiving a broadcast signal may be disposed on one side of the rear case 100A-2. The antennas may be installed so as to be able to be retracted from the rear case 100A-2.

The interface unit 170 may serve as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

The power supply unit 190, which supplies power to the mobile terminal 100, may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided in the rear case 100A-2 may be provided in the front case 100A-1. In addition, the first camera 121a may be configured to be rotatable and thus to cover the shooting direction of the second camera 121b. In this case, the second camera 121b may be optional.

Figure 4:
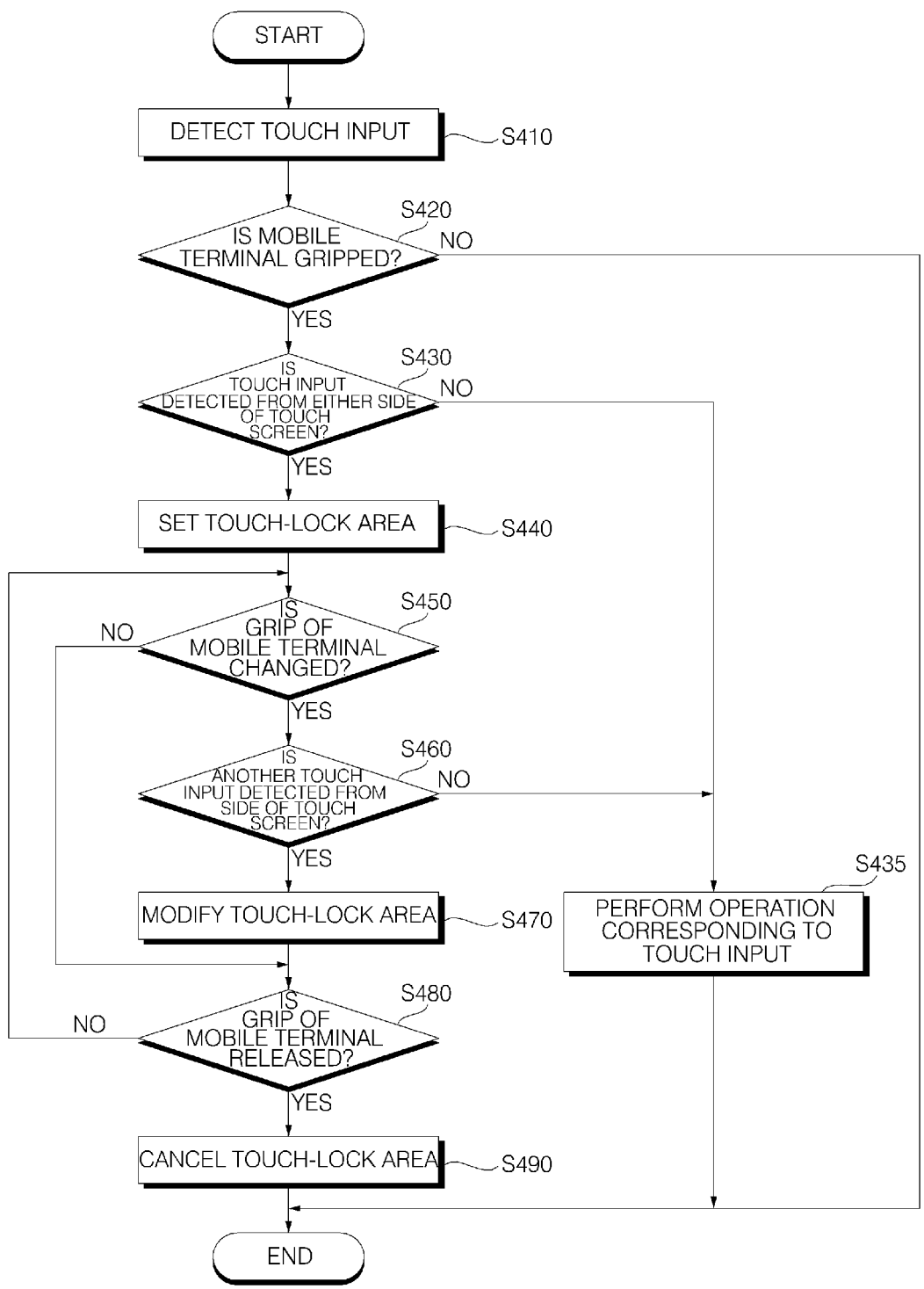
FIG. 4 illustrates a flowchart of a method of controlling a mobile terminal according to an exemplary embodiment of the present invention.

FIG. 4 illustrates a flowchart of a method of controlling a mobile terminal according to an exemplary embodiment of the present invention, and particularly, how to set one or more touch-lock areas in response to a user's touch on the mobile terminal 100. Referring to FIG. 4, the sensing unit 140 may detect a touch input on the mobile terminal 100, and may transmit the results of the detection to the controller 180 (S410). More specifically, a user may touch on a touch-sensing area on the mobile terminal 100 that can sense a touch input entered by the user to switch the mobile terminal 100 between different operating modes or between different display screens. The sensing unit 140 may sense a touch input entered by the user and may provide the results of the sensing to the controller 180. The touch sensing area may include the display module 151, the user input unit 130, and any other part of the mobile terminal 100 where one or more touch sensors are installed.

The sensing unit 140 may include a plurality of touch sensors. Examples of the touch sensors include, but are not limited to, the proximity sensor 141, which senses a proximity input entered by the user, and the pressure sensor 143, which senses a touch input entered by the user, and a temperature sensor (not shown), which senses a variation in temperature resulting from a proximity or touch input entered by the user. The temperature sensor, like the pressure sensor 143, may sense a touch input entered by the user.

Thereafter, the controller 180 may determine whether the mobile terminal 100 is gripped (S420). When the mobile terminal 100 is gripped by a hand of the user, either side of the mobile terminal 100 may be touched by the hand, and the rear surface of the mobile terminal 100 may be covered by the hand. More specifically, when the mobile terminal 100 is held in one hand of the user, a touch sensing area on either side of the mobile terminal 100 may be in contact with the hand and the rear surface of the mobile terminal 100 may be covered, at least partially, by the hand. In this case, the mobile terminal 100 may determine that the mobile terminal 100 is gripped. If the touch-sensing area covers the whole mobile terminal 100, the controller 180 may determine whether the mobile terminal 100 is gripped based on the pattern in which the touch-sensing area is touched or based on a setting of the mobile terminal 100.

If it is determined that the mobile terminal 100 is gripped (S420-Y), the controller 180 may determine whether a touch input has been detected from a particular region (hereinafter referred to as the side area) on the display module 151 (e.g., a touch screen), including the sides of the touch screen, for more than a predefined amount of time (S430). More specifically, the touch screen may include a matrix array of a plurality of touch sensors, and may thus be able to locate a touch or proximity input entered by the user by calculating the coordinates of one of the touch sensors whose capacitance increases due to the touch or proximity input. Then, the controller 180 may determine whether a point with the calculated coordinates belongs to the side area.

If it is determined that a touch signal has been detected from the side area for more than the predefined amount of time (S430-Y), the controller 180 may set a region including the point with the calculated coordinates as a touch-lock area (S440). When the user grips the mobile terminal 100 with a hand, the touch screen may be touched, at least partially, by the hand, and thus, a touch input may be accidentally entered to the mobile terminal 100. However, since this touch input is not for entering a user command, the controller 180 may set a touch-lock area on the touch screen to prevent the mobile terminal 100 from malfunctioning. As a result, the mobile terminal 100 does not respond to any typical touch input entered thereto from the touch-lock area.

If it is determined that a touch input has been detected, but not from the side area, or that a touch input has been detected from the side area, but for less than the predefined amount of time (S430-N), the controller 180 may perform an operation corresponding to the touch input (S435). For example, if a 'Message' icon is displayed on the touch screen outside the side area and a touch input for selecting the 'Message' icon is detected, the controller 180 may execute a message application in response to the touch input and may thus display an execution screen relevant to the message application on the display module 151.

The controller 180 may display the touch-lock area differently from the rest of the touch screen to alert the user to the setting of the touch-lock area on the touch screen. For example, the controller 180 may display the touch-lock area in a different brightness or color from the rest of the touch screen. In addition, the controller 180 may move one or more icons, if any, in the touch-lock area to the outside of the touch-lock area.

The controller 180 may determine whether the manner in which the user grips the mobile terminal 100 has changed (S450). More specifically, the controller 180 may determine whether the user has changed his or her grip of the mobile terminal 100 based on a variation in sensing data provided by the sensing unit 140. and if the grip of the mobile terminal is not changed (S450-N), determine whether the grip of the mobile terminal is released (S480).

If it is determined that the manner in which the user grips the mobile terminal 100 has changed (S450-Y), the controller 180 may determine whether a touch signal has been detected from the side area for more than a predefined amount of time (S460-Y), and may change the touch-lock area based on the location of the detection of the touch signal (S470). If another touch input is detected from side of the touch screen (S460-N), the mobile terminal performs the operation corresponding to the touch input (S435).

Thereafter, if the user releases his or her grip of the mobile terminal 100 (S480-Y), the controller 180 may cancel the touch-lock area (S490) so that the entire touch screen can become a touch-sensing area capable of receiving a user command. If the grip of the mobile terminal is not released (S480-N), determine whether the grip of the mobile terminal is changed (S450).

In this exemplary embodiment, a touch signal for determining whether the mobile terminal 100 is gripped and a touch signal for determining whether to set a touch-lock area on the touch screen may be separate, but the present invention is not restricted to this. That is, the controller 180 may determine whether the mobile terminal 100 is gripped and whether a touch-lock area should be set on the touch screen based on a single touch input, if any, detected from the side area for more than a predefined amount of time.

According to this exemplary embodiment, it is possible to flexibly set a touch-lock area on the display module 151 in response to a touch input detected from the side area on the display module 151 for more than a predefined amount of time. A touch-lock area may be set on the display module 151 differently according to the operating mode of the mobile terminal 100, and this will hereinafter be described in detail with reference to FIG. 5.

Figure 5:
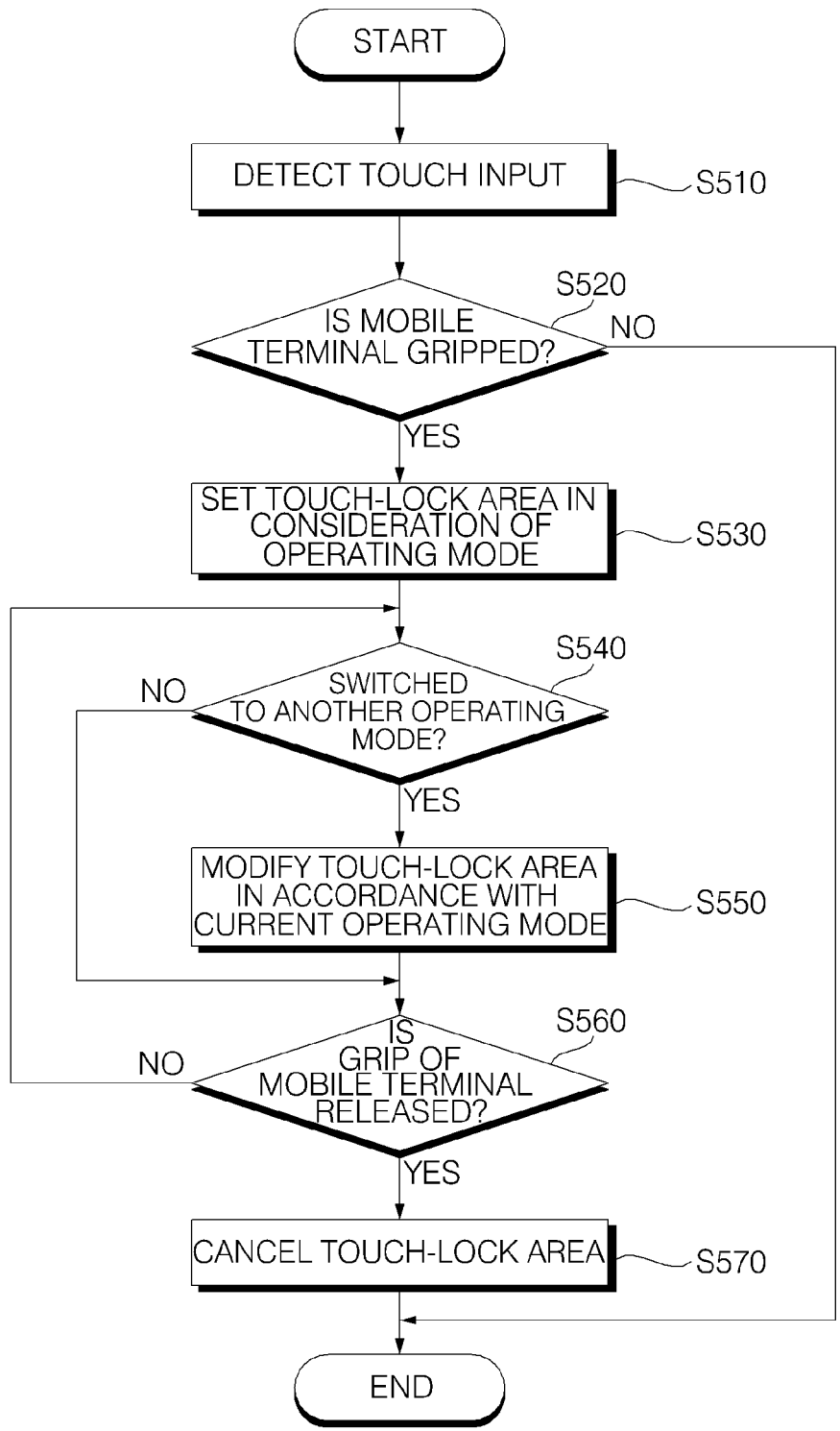
FIG. 5 illustrates a flowchart of a method of controlling a mobile terminal according to another exemplary embodiment of the present invention.

FIG. 5 illustrates a flowchart of a method of controlling a mobile terminal according to another exemplary embodiment of the present invention, and particularly, how to set one or more touch-lock areas on the display module 151 in consideration of the operating mode of the mobile terminal 100. Referring to FIG. 5, the sensing unit 140 may detect a touch input (S510), and the controller 180 may determine whether the mobile terminal 100 is gripped based on the detected touch input the sensing unit 140 (S520). If it is determined that the mobile terminal 100 is gripped by a user (S520-Y), the controller 180 may set a touch-lock area on the touch screen in consideration of a current operating mode of the mobile terminal 100 (S530). More specifically, different touch-lock area setting data for different operating modes of the mobile terminal 100 may be stored in advance in the memory 160. The controller 180 may read out touch-lock area setting data corresponding to the current operating mode of the mobile terminal 100 from the memory 160, may set a touch-lock area on the display module 151 (e.g., a touch screen) based on the read-out data, and may display the touch-lock area differently from the rest of the touch screen. Once the touch-lock area is set on the touch screen, the mobile terminal 100 does not respond to any typical touch input entered thereto through the touch-lock area.

Thereafter, the controller 180 may determine whether the mobile terminal 100 has been switched to another operating mode (S540). The mobile terminal 100 may be manually switched from one operating mode to another operating mode by the user, or may be automatically switched from one operating mode to another operating mode upon the completion of the execution of an application.

If it is determined that the mobile terminal 100 has been switched to another operating mode (S540-Y), the controller 180 may modify the touch-lock area in accordance with the current operating mode the mobile terminal 100 has been switched to (S550). For example, if the mobile terminal 100 is switched from a call mode to a text message mode, the controller 180 may read out touch-lock area setting data corresponding to the text message mode from the memory 160 and may modify the touch-lock area to be appropriate for use in the text message mode based on the read-out data. Then, the controller 180 may display the modified touch-lock area differently from the rest of the touch screen. The mobile terminal 100 does not respond to any typical touch input entered thereto through the modified touch-lock area. If the operating mode is not switched (S540-N), determine whether the grip of the mobile terminal is released (S560).

Thereafter, if the user releases his or her grip of the mobile terminal 100 (S560-Y), the controller 180 may cancel the touch-lock area (S570). And if the grip of the mobile terminal is not released (S560-N), determine whether the operating mode is switched (S540).

According to this exemplary embodiment, it is possible to adaptively set one or more touch-lock areas on the display module 151 in consideration of the operating mode of the mobile terminal 100 and thus to prevent the mobile terminal 100 from malfunctioning due to a touch input entered thereto through any one of the touch-lock areas.

In this exemplary embodiment, the controller 180 may set a touch-lock area on the display module 151 in consideration of the operating mode of the mobile terminal 100 when the mobile terminal 100 is gripped, but the present invention is not restricted to this. That is, the controller 180 may set a touch-lock area on the display module 151 in consideration of the operating mode of the mobile terminal regardless of whether the mobile terminal 100 is gripped.

Figure 6:
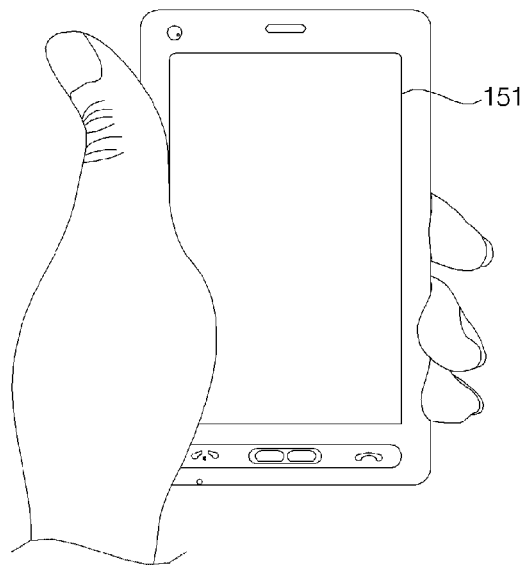
FIG. 6 illustrates diagrams for explaining an example of how to set a touch-lock area in response to a touch input.
Figure 6:
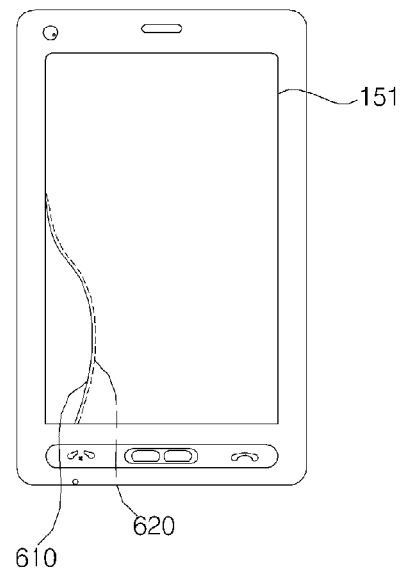
Figure 6:
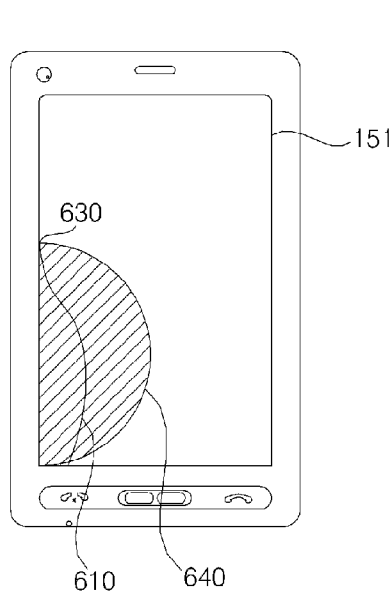
Figure 6:
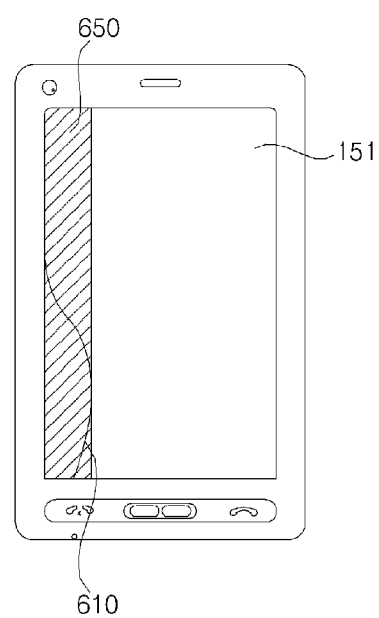

FIG. 6 illustrates diagrams for explaining an example of how to set one or more touch-lock areas on the display module 151 in response to a touch input. When a user grips the mobile terminal 100 with one hand, as shown in FIG. 6(a), either side of the display module 151 (e.g., a touch screen) may be touched by the hand, and the rear surface of the mobile terminal 100 may be covered, at least partially, by the hand. The controller 180 may determine whether the mobile terminal 100 is gripped based on touch signals, if any, detected from either side of the touch screen by the touch sensors in the sensing unit 140. Alternatively, the controller 180 may detect touch signals, if any, from either side of the touch screen without the aid of the touch sensors in the sensing unit 140, and may determine whether the mobile terminal 100 is gripped based on the results of the detection.

If the mobile terminal 100 is gripped and there is a touch signal detected from the side area of the touch screen for more than a predefined amount of time, the controller 180 may set an area of the detection of the touch signal or a region including the area 610 as a touch-lock area. That is, as shown in FIG. 6(b), the controller 180 may set the area 610 of the detection of the touch signal or a region 620 including the area 610 and a margin of error as a touch-lock area.

More specifically, referring to FIG. 6(c), the controller 180 may set a semicircle 640 including the area 610 and having a radius r that is half the length of the left side of the area 610 as a touch-lock area. Alternatively, referring to FIG. 6(d), the controller 180 may set a rectangle 650 including the area 610 and having the same width as the area 610 as a touch-lock area.

In short, the controller 180 may set the area 610 or a region including the area 610 as a touch-lock area.

Figure 7:
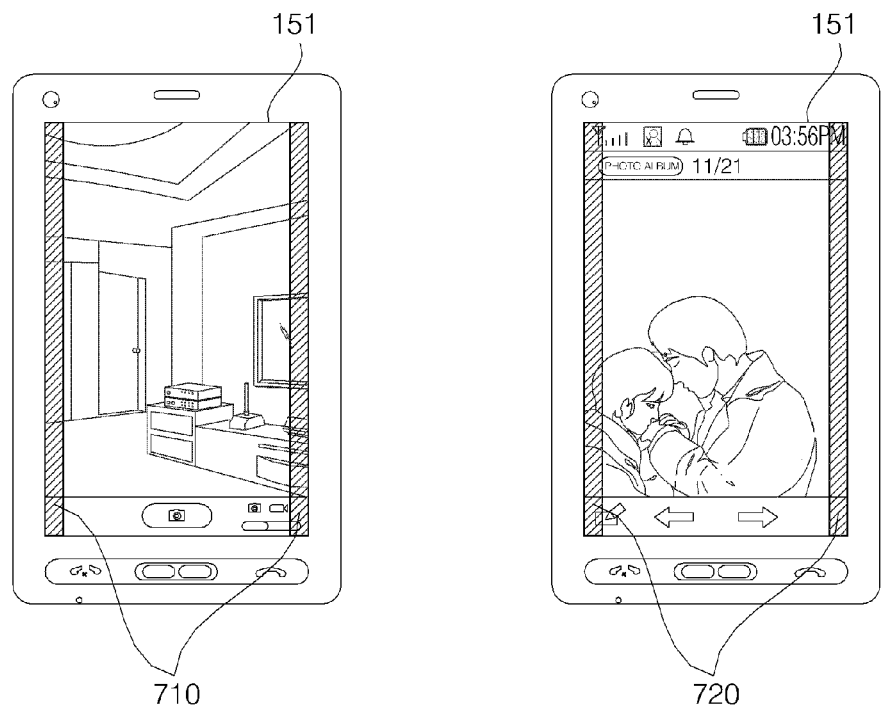
FIG. 7 illustrates diagrams for an example of how to set a touch-lock area on a touch screen of a mobile terminal in consideration of the operating mode of the mobile terminal.
Figure 7:
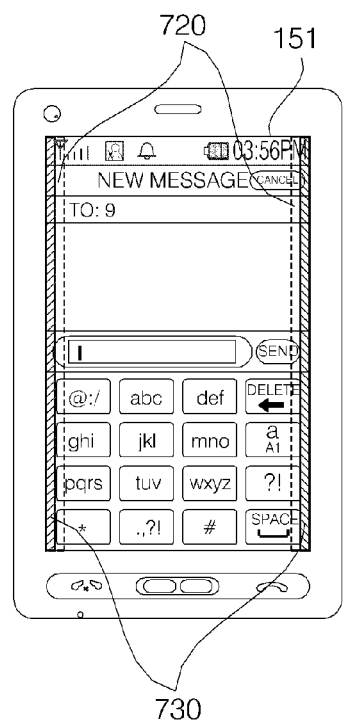

FIG. 7 illustrates diagrams for explaining an example of how to set one or more touch-lock areas on the display module 151 in consideration of the operating mode of the mobile terminal 100. A user may change his or her grip of the mobile terminal 100 according to the operating mode of the mobile terminal 100. Thus, different touch-lock area setting data for different operating modes of the mobile terminal 100 may be stored in advance in the memory 160. The controller 180 may read out touch-lock area setting data corresponding to a current operating mode of the mobile terminal 100 from the memory 160, and may set one or more touch-lock areas on the display module 151, e.g., a touch screen, based on the read-out data. FIG. 7(a) illustrates touch-lock areas 710 set for a camera mode, FIG. 7(b) illustrates touch-lock areas 720 set for a music player mode, and FIG. 7(c) illustrates touch-lock areas 730 set for a text input mode.

An area on either side of the touch screen may be set as a touch-lock area in consideration that either side of the touch screen is likely to be touched by the hands of a user when the user grips the mobile terminal 100. Referring to FIGS. 7(a) and 7(c), the touch-lock areas 710 may be set to be larger than the touch-lock areas 730 in consideration that the user tends to firmly grip the mobile terminal 100 with both hands when taking a photo or video with the mobile terminal 100, and that the user is likely to contact a wider area when gripping the mobile terminal 100 with both hands than when gripping the mobile terminal 100 with only one hand.

Referring to FIGS. 7(a) through 7(c), a rectangle on either side of the touch screen may be set as a touch-lock area, but the present invention, the controller 180 may set a touch-lock area in various shapes other than a rectangle.

Referring to FIGS. 7(a) and 7(b), the size, the shape and location of a touch-lock area 710, 720 may vary according to the operating mode of the mobile terminal 100 or the amount by which the touch screen is contacted by the hands of the user, but the present invention is not restricted to this. For example, the size, shape and location of a touch-lock area may vary in response to a user command.

Figure 8:
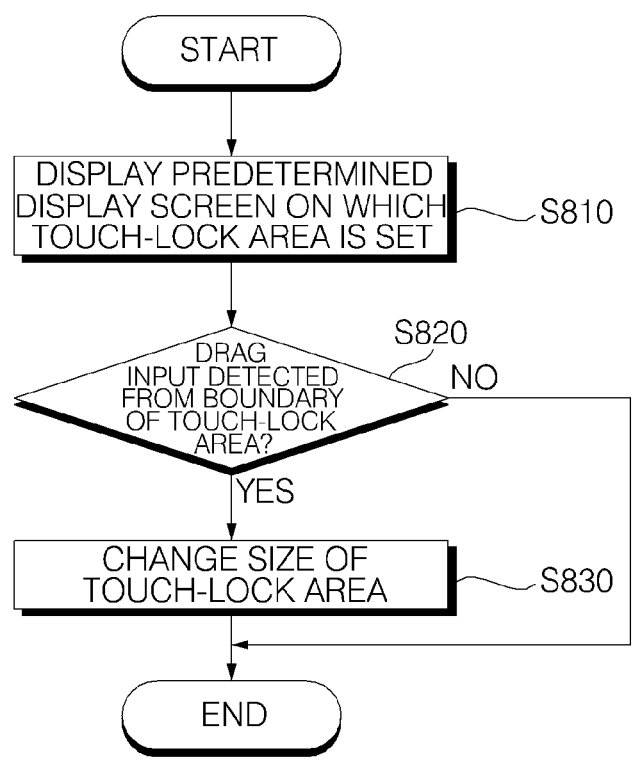
FIG. 8 illustrates a flowchart of a method of controlling a mobile terminal according to another exemplary embodiment of the present invention.
Figure 9:
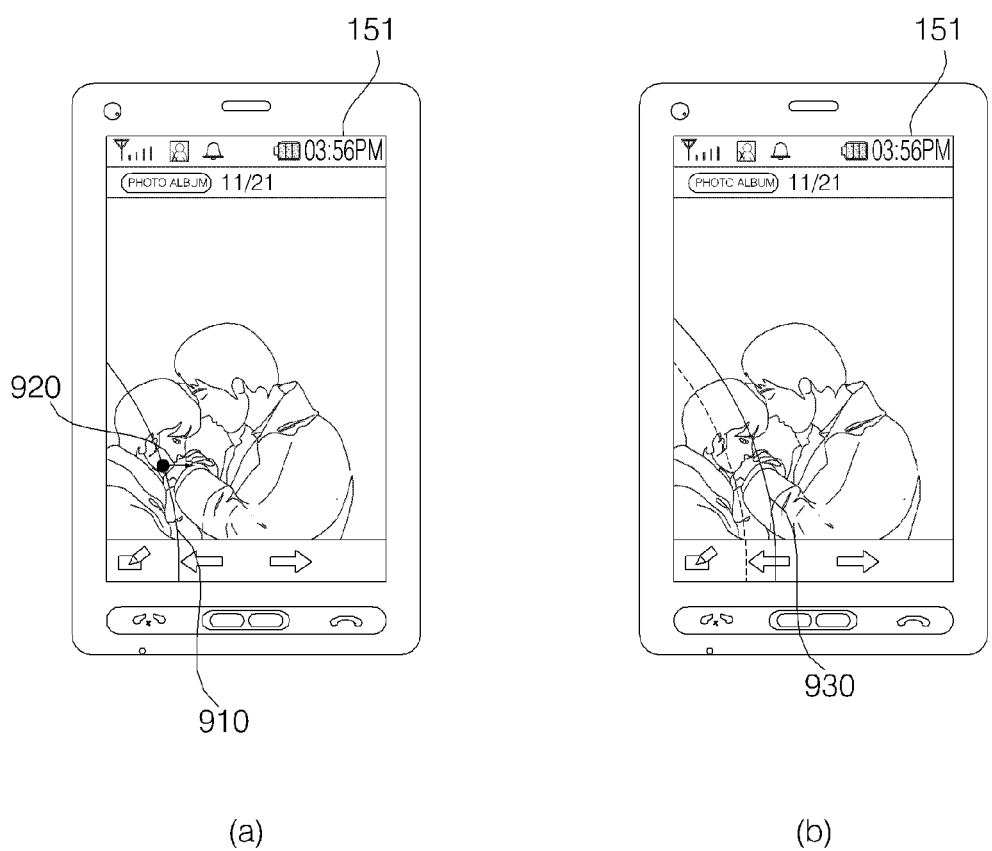
FIG. 9 illustrates diagrams for explaining an example of how to modify a touch-lock area in response to a user command.

FIG. 8 illustrates a flowchart of a method of controlling a mobile terminal according to another exemplary embodiment of the present invention, and particularly, how to modify a touch-lock area in response to a user command, and FIG. 9 illustrates diagrams for explaining the exemplary embodiment of FIG. 8. Referring to FIG. 8, when a touch-lock area is set on the display module 151 (e.g., a touch screen) on which a predetermined display screen is displayed (S810), the controller 180 may determine whether a user command involving a drag input has been detected from the boundary of the touch-lock area (S820). Thereafter, if it is determined that a user command involving a drag input has been detected from the boundary of the touch-lock area (S820-Y), the controller 180 may change the size of the touch-lock area in response to the drag input (S830). For example, referring to FIGS. 9(a) and 9(b), if a user command 920 involving dragging the boundary of a touch-lock area 910 to the right is received, the controller 180 may expand the touch-lock area 910 by an amount corresponding to the distance by which the boundary of the touch-lock area 910 is dragged. As a result, a new touch-lock area 930 may be set on the touch screen. Alternatively, if a user command for touching and dragging the boundary of the touch-lock area 910 to the left is received, the controller 180 may reduce the touch-lock area 910 by an amount corresponding to the distance by which the touch-lock area 910 is dragged.

According to this exemplary embodiment, it is possible to effectively change the size of a touch-lock area in response to a user command and thus improve user satisfaction. A user command that can be entered to the mobile terminal 100 through the display module 151 may be classified into a touch input and a drag input. Once one or more touch-lock areas are set on the display module 151, the mobile terminal 100 may not respond to a typical touch input entered thereto through any one of the touch-lock areas, but may respond to a particular drag input entered thereto through one of the touch-lock areas, and this will hereinafter be described in further detail.

Figure 10:
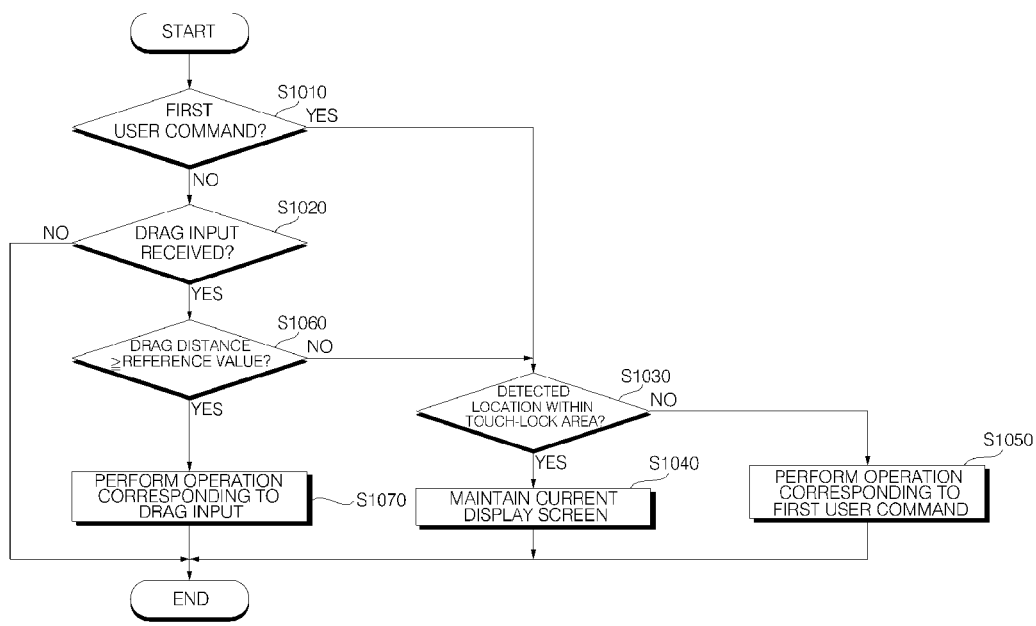
FIG. 10 illustrates a flowchart of a method of controlling a mobile terminal according to another exemplary embodiment of the present invention.

FIG. 10 illustrates a flowchart of a method of controlling a mobile terminal according to another exemplary embodiment of the present invention, and particularly, how the mobile terminal 100 operates in response to a user command when a touch-lock area is set on the display module 151. Referring to FIG. 10, if a first user command involving a touch input is received (S1010-Y), the controller 180 may determine whether the location of the detection of the first user command is within a touch-lock area on the display module 151, e.g., a touch screen (S1020). If it is determined that the location of the detection of the first user command is within a touch-lock area on the touch screen (S1030-Y), the controller 180 may ignore the first user command, and may maintain a current display screen on the touch screen (S1040). On the other hand, if it is determined that the location of the detection of the first user command is outside the touch-lock area on the touch screen (S1030-N), the controller 180 may perform an operation corresponding to the first user command (S1050).

If a second user command involving a drag input is received (S1020-Y), the controller 180 may calculate a drag distance of the drag input, and may determine whether the calculated drag distance exceeds a reference value (S1060). If it is determined that the calculated drag distance exceeds the reference value (S1060-Y), the controller 180 may perform an operation corresponding to the second user command regardless of whether the second user command is detected within the touch-lock area (S1070). If drag distance is smaller than the reference value, the terminal determines whether the touch is detected in the touch-lock area.

According to this exemplary embodiment, since the mobile terminal 100 can respond even to a user command detected from the touch-lock area if the user command involves a drag input with a drag distance greater than a reference value, even the touch-lock area may be used to enter a user command to the mobile terminal 100.

Figure 11:
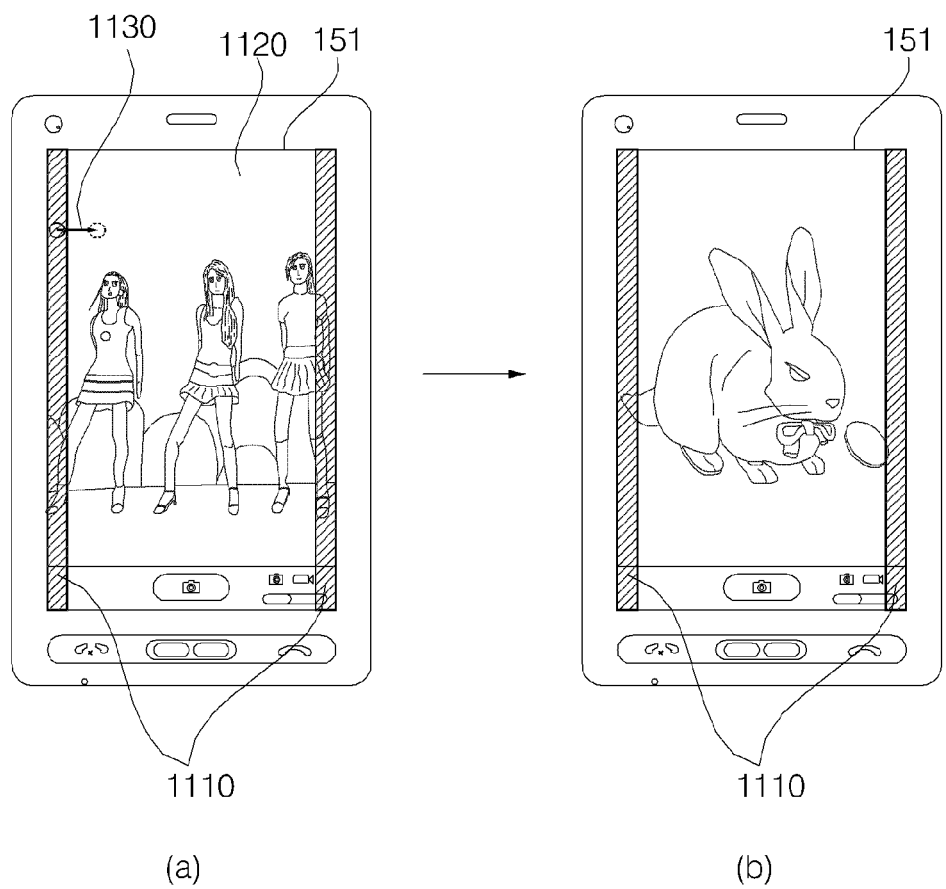
FIG. 11 illustrates diagrams for explaining how a mobile terminal operates in response to a drag input when a touch-lock area is set on a touch screen of the mobile terminal.

FIG. 11 illustrates diagrams for explaining an example of how the mobile terminal 100 operates in response to a drag input when one or more touch-lock areas are set on the display module 151. Referring to FIG. 11(a), touch-lock areas 1110 may be set on the display module 151, e.g., a touch screen, and may be displayed differently from the rest of the touch screen, i.e., a touch-sensing area 1120, so as to be easily distinguishable. The mobile terminal 100 does not respond to a typical touch input entered thereto through any one of the touch-lock areas 1110. However, if a user command 1130 involving dragging one of the touch-lock areas 1110, e.g., the left-side touch-lock area 1110, is received, the controller 180 may determine whether the distance by which the left-side touch-lock area 1110 is dragged exceeds a reference value. Referring to FIG. 11(b), if it is determined that the distance by which the left-side touch-lock area 1110 is dragged exceeds the reference value, the controller 180 may perform an operation corresponding to the user command 1130, and may display a display screen relevant to the operation on the touch screen.

That is, the controller 180 may control the mobile terminal 100 not to respond to a typical touch input entered thereto through any one of the touch-lock areas 1110 unless the touch input accompanies a drag input with a drag distance greater than the reference value.

Referring to FIG. 11, the touch-lock areas 1110 may be set on the touch screen in response to a touch input, if any, detected from either side of the touch screen for more than a predefined amount of time when the mobile terminal 100 is gripped by one or both hands of a user with or without consideration of the operating mode of the mobile terminal, but the present invention is not restricted to this.

Figure 12:
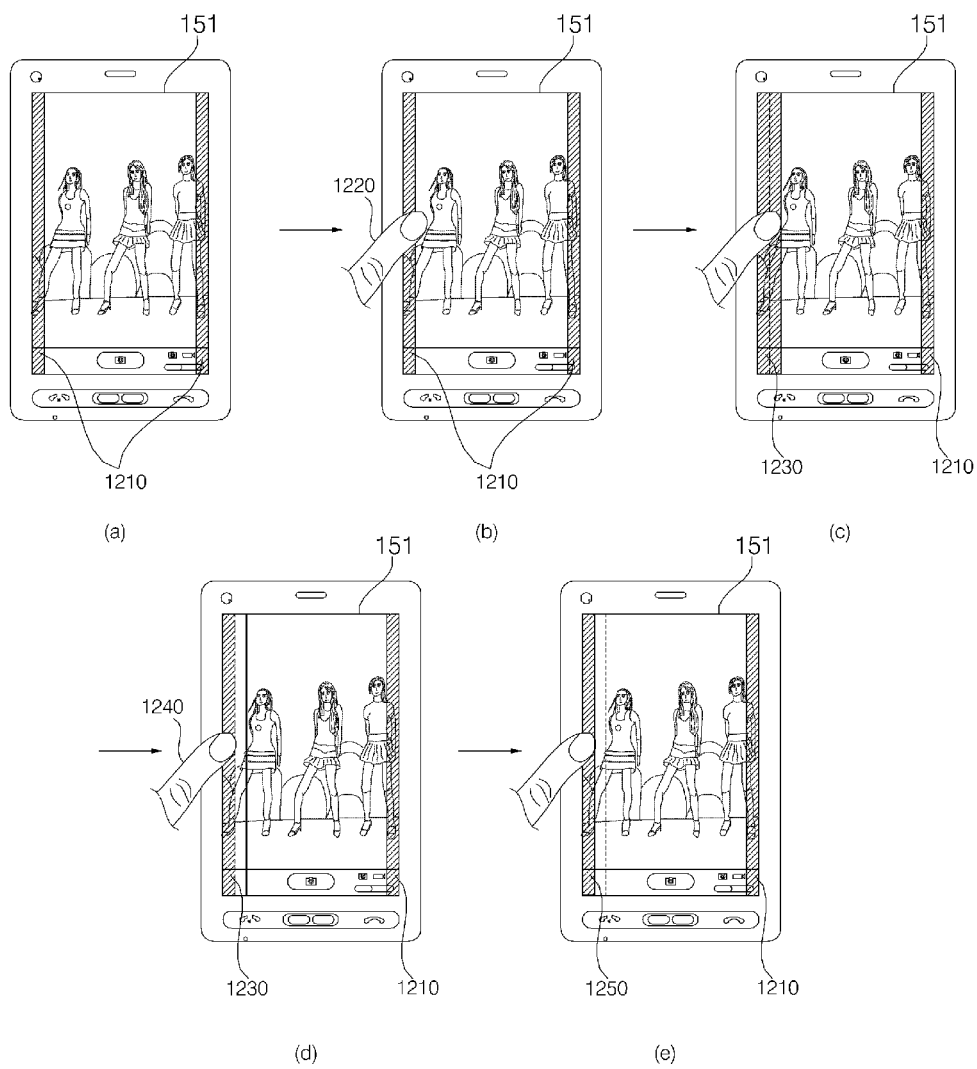
FIG. 12 illustrates diagrams for explaining how to set a touch-lock area on a touch screen of a mobile terminal in consideration of the operating mode of the mobile terminal and an area of the detection of a touch input.

FIG. 12 illustrates diagrams for explaining an example of how to set one or more touch-lock areas on the display module 151 in consideration of both the operating mode of the mobile terminal 100 and the location of the detection of a touch input. Referring to FIG. 12(a), when the mobile terminal 100 is placed in a predetermined operating mode, the controller 180 may set one or more touch-lock areas 1210 on the display module 151, e.g., a touch screen, in consideration of the predetermined operating mode, and may display the touch-lock areas 1210 differently from the rest of the touch screen so as to be easily distinguishable. If a touch input 1220 is detected from one side of the touch screen for more than a predefined amount of time, the controller 180 may determine whether an area of the detection of the touch input 1220 is included in one of the touch-lock areas 1210. Referring to FIGS. 12(b) and 12(c), since the area of the detection of the touch input 1220 extends beyond one of the touch-lock areas 1210, i.e., the left-side touch-lock area 1210, the controller 180 may expand the left-side touch-lock area 1210 into a touch-lock area 1230 so that the area of the detection of the touch input 1220 can be included in the touch-lock area 1230.

Referring to FIG. 12(d), if the touch-lock area 1230 is too large for an area of the detection of a touch input 1240, the controller 180 may reduce the touch-lock area 1230 into a touch-lock area 1250 so that the area of the detection of a touch input 1240 can be circumscribed within the touch-lock area 1250.

According to the present invention, once one or more touch-lock areas are set on a touch screen of a mobile terminal, the mobile terminal does not respond to any typical touch input entered thereto through any one of the touch-lock areas, but may respond to a particular drag input entered thereto through one of the touch-lock areas. Therefore, it is possible to prevent the mobile terminal from performing an operation against the will of a user. In addition, since the size and location of the touch-lock areas can be easily changed, it is possible to improve user satisfaction.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    setting a first touch-lock area corresponding to a first operating mode of the mobile terminal on a touchscreen, wherein no icons relating to the first operating mode are displayed within the first touch-lock area of the touchscreen;
    setting a second touch-lock area on the touchscreen when a touch input is received at a side area of the touchscreen for more than a threshold length of time, wherein the second touch-lock area includes an area of the touchscreen that corresponds to the touch input and an additional area of the touchscreen;
    modifying a size of the second touch-lock area of the touchscreen when the mobile terminal is changed from the first operating mode to a second operating mode; and
    causing all displayed icons associated with the second operating mode to be displayed outside of the modified size of the second touch-lock area and within a touch-unlock area of the touchscreen after the mobile terminal is changed from the first operating mode to the second operating mode.

2. The method of claim 1, wherein the touch input is from the mobile terminal being gripped.

3. The method of claim 1, wherein the second touch-lock area is rectangular or semicircular.

4. The method of claim 1, wherein the second touch-lock area is a semicircle, wherein a center of the semi-circle is a first point on one side of the touch screen and a radius of the semi-circle is a distance between the first point and a second point in the area of the touch input.

5. The method of claim 1, further comprising:
    detecting a drag input; and
    performing an operation corresponding to the drag input if a drag distance of the drag input exceeds a threshold distance.

6. The method of claim 1, wherein the modifying the size of the second touch-lock area comprises expanding the second touch-lock area if a width of the area of the touch input is larger than a width of the first touch-lock area.

7. The method of claim 1, wherein the modifying the size of the second touch-lock area comprises reducing the second touch-lock area if a width of the area of the touch input is smaller than a width of the first touch-lock area.

8. A mobile terminal comprising:
    a touchscreen;
    a memory configured to store information; and
    a controller configured to:

set a first touch-lock area corresponding to a first operating mode of the mobile terminal on the touchscreen, wherein no icons relating to the first operating mode are displayed within the first touch-lock area of the touchscreen;

set a second touch-lock area on the touchscreen when a touch input is received at a side area of the touchscreen for more than a threshold length of time, wherein the second touch-lock area includes an area of the touchscreen that corresponds to the touch input and an additional area of the touchscreen;

modify a size of the second touch-lock area of the touchscreen when the mobile terminal is changed from the first operating mode to a second operating mode; and cause all displayed icons associated with the second operating mode to be displayed outside of the modified size of the second touch-lock area and within a touch-unlock area of the touchscreen after the mobile terminal is changed from the first operating mode to the second operating mode.

9. The mobile terminal of claim 8, wherein the touch input is from the mobile terminal being gripped.

10. The mobile terminal of claim 8, wherein the second touch-lock area is rectangular or semicircular.

11. The mobile terminal of claim 8, wherein the second touch-lock area is a semicircle, wherein a center of the semi-circle is a first point on one side of the touch screen and a radius of the semi-circle is a distance between the first point and a second point in the area of the first touch input.

12. The mobile terminal of claim 8, wherein the controller is further configured to:
  detect a drag input; and
  perform an operation corresponding to the drag input if a drag distance of the drag input exceeds a threshold distance.

13. The method of claim 1, further comprising:
  displaying the modified size second touch-lock area such that the modified size second touch-lock area is distinguishable from the touch-unlock area.

14. The method of claim 1, further comprising:
  changing a size of the modified size second touch-lock area in response to a drag input dragging a boundary line defined between the modified size second touch-lock area and the touch-unlock area.

15. The method of claim 1, wherein, when the first operating mode is a camera mode and the second operating mode is a text input mode, wherein the first touch-lock area corresponding to the camera mode is larger than the second touch-lock area corresponding to the text input mode.

16. The method of claim 1, wherein the modifying the size of the second touch-lock area comprises modifying at least one side area of the touchscreen corresponding to a location of the touch input.

17. The mobile terminal of claim 8, wherein the controller is further configured to:
  displaying the modified size second touch-lock area such that the modified size second touch-lock area is distinguishable from the touch-unlock area.

18. The mobile terminal of claim 8, wherein the controller is further configured to:
  changing a size of the modified size second touch-lock area in response to a drag input dragging a boundary line defined between the modified size second touch-lock area and the touch-unlock area.

19. The mobile terminal of claim 8, wherein when the first operating mode is a camera mode and the second operating mode is a text input mode, the first touch-lock area corresponding to the camera mode is larger than the second touch-lock area corresponding to the text input mode.

* * * * *